Aug. 28, 1973 H. GUTH 3,755,549
CATALYTIC OXIDATION OF $SO_2$ TO $SO_3$
Filed May 25, 1971
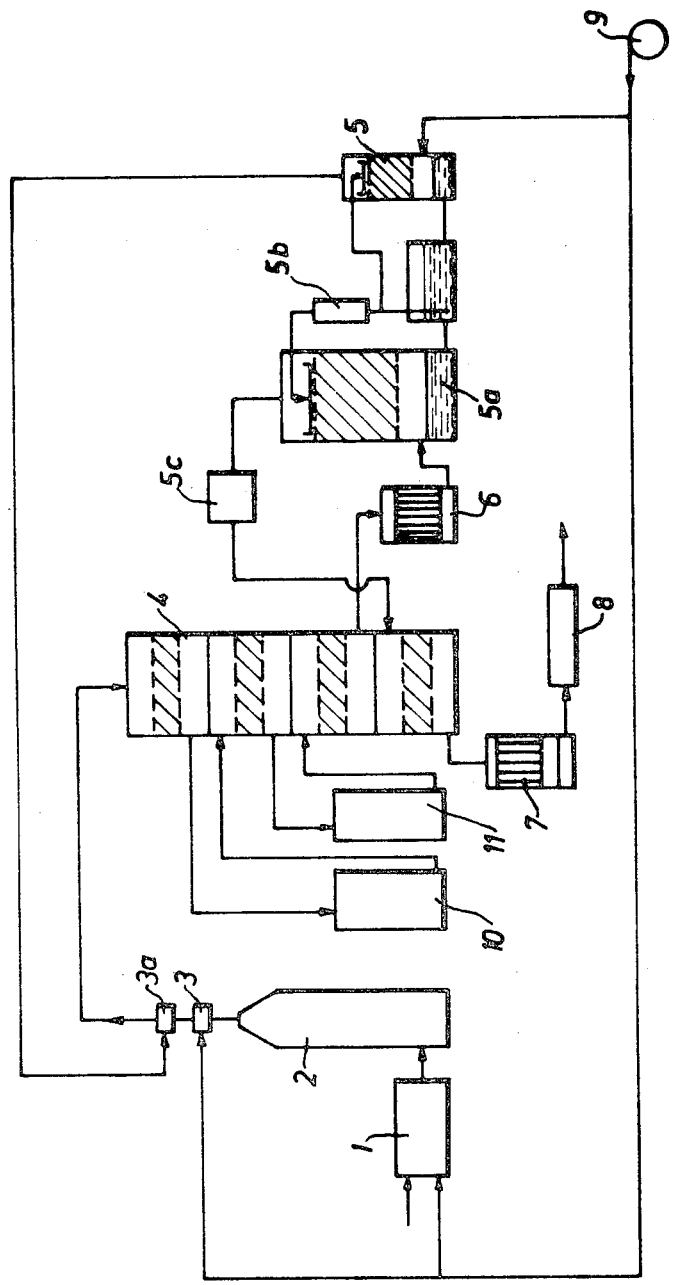
INVENTOR:
HANS GUTH
BY
Burgess, Dinklage & Sprung

United States Patent Office 3,755,549
Patented Aug. 28, 1973

3,755,549
CATALYTIC OXIDATION OF SO₂ TO SO₃
Hans Guth, Bergisch-Neukirchen, Germany, assignor to Bayer Aktiengesellschaft, Leverkusen, Germany
Filed May 25, 1971, Ser. No. 146,713
Claims priority, application Germany, June 2, 1970,
P 20 26 818.2
Int. Cl. C01b 17/08
U.S. Cl. 423—533            6 Claims

ABSTRACT OF THE DISCLOSURE

In the process for producing $SO_3$ comprising the steps of catalytically oxidizing $SO_2$ with air to $SO_3$ in a plurality of contact stages and subjecting the product gases to absorption to remove some of the $SO_3$ at some stage prior to the last and after an $SO_2$ conversion of about 80 to 95%, the improvement which comprises incorporating in the $SO_2$-containing gas prior to its introduction into the first catalyst stage an air stream which has been passed through oleum and thereby picked up $SO_3$, the proportions being such that the resultant gas fed to the first catalyst stage contains about 2 to 10% by volume of $SO_3$. The liquid which is used to absorb some of the $SO_3$ in the product gases prior to the last stage is taken from a common supply with the oleum through which the air stream is passed to pick up $SO_3$. The $SO_2$-containing gas can be of 12 to 21% concentration by volume, produced by burning sulfur, and be diluted to 10 to 14% before catalytic oxidation to $SO_3$; if a roasting or cleavage gas of 12 to 30% $SO_2$ concentration is used, it may be diluted to 10 to 20%.

---

The present invention relates to an improved process for the catalytic oxidation of gases containing a high percentage of $SO_2$.

With the catalytic production of sulfuric acid, industrially produced sulfur dioxide is burnt in admixture with excess air on a catalyst, for example a vanadium pentoxide-silicon oxide catalyst, at a suitable temperature. The catalyst has to be brought to a certain minimum temperature by the hot reaction gases. This minimum temperature is the so-called initiation temperature, which can have a different value with each industrial catalyst mass according to the composition and method of production, for example, 450° C. Below this initiation temperature, the reaction

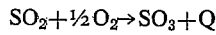

$$SO_2 + \tfrac{1}{2}O_2 \rightarrow SO_3 + Q$$

does not proceed with sufficient speed and heat evolution, so that it comes to a halt. Heating occurs as the gases pass through the catalyst mass, this heating being proportional to the degree of conversion. At a certain temperature which depends on the initial composition of the gas, for example, 580° C., the reaction comes to a halt, because then the speed of formation of the sulfur trioxide is exactly equivalent to its speed of decomposition. In order to produce the highest possible conversion in each contact stage, the temperature range, i.e. the difference in temperature between the input temperature of the reaction gases into the catalyst and the equilibrium temperature, must be kept as large as possible, and this is only possible when a low input temperature is employed.

With catalyst installation having the best possible heat insulation, the initiation temperature of the catalyst material, as just defined, is chosen as the gas input temperature.

If the $SO_2$-containing gas used for the reaction has a high $SO_2$ content (with modern installation, $SO_2$ contents of 10% and more are used), considerable heat is liberated, particularly in the first catalyst stage, so that the permissible temperature is easily exceeded. Without taking any special measures, temperatures which are far higher than 600° C. are obtained with the reaction in the first catalyst stage, if the input temperature is maintained at about 450° C.

With sulphur combustion gases, because of the more favorable $O_2/SO_2$ ratio, contact is also possible with $SO_2$ concentrations which are higher than 12%. The higher the selected $SO_2$ concentration of the contact or catalyst gases, the higher must be the input temperature, in order to obtain the catalyst capacity of the mass, which naturally results in a further raising of the temperature up to 640° C. to 650° C. in the first level. At these high temperatures, however, the catalyst can already be damaged, apart from the fact that too high temperatures place a heavy strain on the apparatus.

It is known to reduce the temperature in the catalyst stages by the introduction of cold gases. The indirect heat dissipation by means of fitted heat exchangers is also known. However, these measures frequently are insufficient for avoiding local overheating of the catalyst mass, especially when gases containing 9% or more of $SO_2$ are used.

A process for the catalytic oxidation of $SO_2$ to $SO_3$ in several catalyst stages has also been proposed, in which a part of the gases to be reacted, after pre-heating to at least the initiation temperature, are conducted at flow velocities of from 0.6 to 2.0 m./sec. through a preliminary catalyst disposed in front of the main catalyst. The resulting gases issuing from the preliminary catalyst are mixed with such quantities of colder gases containing $SO_2$ that the mixed gas contains from 20% to 30% of the original $SO_2$ in the form of $SO_3$, the temperature of the resulting mixed gas not being lowered to below the initiation temperature of the main catalyst. The mixed gas thus obtained is then further reacted by catalysis to $SO_3$ by a conventional method.

German Auslegeschrift No. 1,066,557 also describes a process in which a partial stream of the reaction gases from one catalyst stage is utilized for the indirect heating of the fresh gases up to the initiation temperature. Furthermore, these already partially reacted gases can also be directly mixed with the fresh gases. It is true that this procedure achieves a good heat regulation of the catalyst system, but it also results in the use of large quantities of gases in circulation because of the proportion of inert gas, which is present.

It is accordingly an object of the present invention to provide an improved economical process for the efficient catalytic oxidation of $SO_2$ to $SO_3$.

This is realized in accordance with the invention by catalyticaly oxidizing $SO_2$ to $SO_3$ in several catalyst stages with an intermediate absorption of the intermediately formed $SO_3$ after an $SO_2$ conversion of about 80% to 95%. The gases containing $SO_2$, before being introduced into the fiirst catalyst stage, have added thereto $SO_3$ in sufficient amount to bring its concentration to about 2% to 10% by volume, together with at least a component stream of the necessary dilution air, this component stream containing $SO_3$ being produced by exhaustion of oleum.

The result obtained by this addition of $SO_3$ is that the reaction starts at a certain $SO_3$ proportion which is already equivalent to a preliminary conversion. The equilibrium in the first stage is now to be set at a higher $SO_3/SO_2$ ratio than with the reaction of pure $SO_2$. As a result the reaction temperature in the preliminary catalyst is lowered to below the temperature of from 620° C. to 630° C., which is set, for example, with the reaction of pure gases containing 10% of $SO_2$.

The addition of $SO_3$ can be achieved by the necessary dilution air or, depending on the concentration of the combustion gases, a part of the dilution air, being conducted through a tower through which oleum is trickling.

As a result, the air is increased in saturation to a content of about 15 to 25% of $SO_3$, depending on the concentration and temperature of the oleum resulting from the tandem production of oleum.

We have for example found that an addition of 2% of $SO_3$ to the catalyst gas with 12% of $SO_2$ produces a reduction in temperature after the preliminary catalyst stage of substantially 25° C. as compared with the reaction without the addition of $SO_3$. The proportion of air which is to be saturated with $SO_3$ corresponds, depending on the $SO_3$ content, to substantially 10% of the total air quantity. By this simple method of lowering the temperature in the preliminary catalyst stage, it is readily possible for gases with a content of $SO_2$ higher than 10%, for example 12% of $SO_2$ or more, to be processed catalytically without dangerously high temperatures being set up. The mixed gas is then converted in known manner by the main catalyst in one or more stages substantially to $SO_3$, without impermissibly high temperatures, for example above 600 to 620° C., occurring at any point in the catalytic furnace. The main catalyst is in conventional manner subdivided into two or more stages, preferably with interposed heat exchangers or equivalent devices.

Furthermore, an intermediate absorption, for example, according to the porcess of U.S. patent specification No. 3,259,459, is interposed in known manner into one of the last stages, preferably before the last catalytic stage. This method of procedure can be used for each of the known $SO_2/SO_3$ catalysts. Vanadium catalysts are preferably used. The catalysts employed in the separate catalyst stages may be the same or different.

It is an additional advantage of this process that the heat extracted from the oleum circuit with the saturation of the supplementary air with $SO_3$ is recovered as useful heat, for example, in the form of an additional vapor production, by contrast with the normal cooling of the oleum, with which the heat is dissipated as lost heat. Furthermore, a further increase in the vapor yield is provided by the possibility of being able to work with gases of higher concentration.

The invention will be further described with reference to the accompanying drawing which is a flow sheet of the process.

Referring now more particularly to the drawing, the numerals have reference to the following apparatus:

1 = sulfur combustion furnace
2 = waste heat boiler
3 and 3a = mixing chambers
4 = catalyst vessel
5 = $SO_3$ sublimation tower
5a = oleum tower
5b = acid condenser
5c = intermediate absorption
6 = heat exchanger
7 = heat exchanger
8 = final absorption
9 = fan for dried air
10+11 = cooling stage Sulfur and air are burned stoichiometrically in a sulfur combustion furnace 1. In a following waste heat boiler 2, the combustion gases are cooled to about 800° C. In two following mixing chambers 3 and 3a, the residual air is added for diluting the gases to a content of about 10% $SO_2$. Part of the dilution air, about 10% in the example referred to, is conducted through an $SO_3$ exhausting tower 5, which is connected in parallel as regards liquid flow to an oleum tower 5a, where it becomes saturated with $SO_3$. With an oleum concentration of 35% and a supply temperature of 70° C., the air which is conducted through is increased in saturation to a content of about 20% $SO_3$. By the admixture of the air containing $SO_3$, a catalyst gas of the following composition is obtained: 10% $SO_2$, 2% $SO_3$, the remainder oxygen and nitrogen, which is converted in the usual manner in a catalytic furnace 4. With the addition of $SO_3$ of 2%, and with an inlet temperature of 450° C., the catalyst temperature after the first stage is adjustable to substantially 595° C.

The furnace 4 has four catalyst stages, each in a separate compartment. Gas from mixing chamber 3a is supplied to the uppermost compartment and product gas moves to the next compartment after passage through the cooling stage 10. In going from the second to the third compartment, the gas passes through the cooling stage 11. The gas, in which about 90% of the $SO_2$ has been converted, now passes through heat exchanger 6 into oleum tower 5a to absorb much of the $SO_3$ contained therein and the $SO_2$-depleted gas is recycled to the catalyst furnace, entering the lowermost compartment. Product gas, about 99.7% converted, is cooled at 7 and conveyed 8 to final absorption. Further process details are set out in German Auslegeschrift No. 1,136,988.

In the manner just described, sulfur combustion gases with a concentration of 9 to 12% by volume of $SO_2$ and even higher $SO_2$ contents can be converted very economically and safely, particularly for the first catalyst stage. However, the process according to the invention can also be employed in like manner on $SO_2$-containing gases of other origin, i.e. from cleavage or roasting processes. The high-percentage gases such as are formed in modern cleavage and roasting installations, after purification, are mixed before, during or after being heated up to the initiation temperature with the necessary quantity of dilution air, of which either a component stream or even the total quantity is charged with $SO_3$. As with the process using sulfur combustion gases, no particular problems arise when carrying out the process using such cleavage or roasting gases.

The process according to the invention is more fully described in the following examples:

EXAMPLE 1

In an installation producing 800 tons of $SO_3$ per day using an apparatus according to the drawing, sulfur is burned in 45,000 m.³/h. (at N.T.P.) of air to produce an $SO_2$-containing gas which is cooled from a combustion temperature of 1650° C. to 800° C. An additional 42,000 m.³/h. (at N.T.P.) of air is mixed with the combustion gas to bring its temperature to the 450° C. required for the catalysis and to an $SO_2$ concentration of 10%. Some of this dilution air, 8,700 m.³/h. (at N.T.P.) in the present example, is however conducted beforehand through the $SO_3$ saturation tower, which is connected in parallel on the liquid side with the oleum tower proper, where it is charged with 20% of $SO_3$=1600 m.³ of $SO_3$ at N.T.P., so that a catalyst gas with the following composition at N.T.P. is produced:

8,100 m.³/h. $SO_2$
1,600 m.³/h. $SO_3$
9,600 m.³/h. $O_2$
68,700 m.³/h. $N_2$

With the passage through the first catalyst stage, the gas is heated from 450 to 595° C. After the first stage, the conversion is 71%. After further conversion in the following three stages, with intermediate absorption before the last stage, a total conversion of $SO_2$ of 99.7% is produced.

EXAMPLE 2

The pyrites roasting gas (34,000 m.³/h. at N.T.P.) of an $SO_3$ installation producing 400 tons per day, on leaving the roasting assembly operating with cooling, has a composition of (at N.T.P.):

14% $SO_2$=4,750 m.³/h. $SO_2$
83.2% $N_2$=28,400 m.³/h. $N_2$
2.8% $O_2$=950 m.³/h. $O_2$

For dilution to a mixture capable of being catalytically converted and containing 11% $SO_2$, 9,000 m.³/h. of air (at N.T.P.) are required. Of this quantity of air, 4,300 m.³/h. (at N.T.P. are diverted as in Example 1 through an SO₃ exhausting tower wherein it picks up SO₃ to a concentration of 20%, so that a gas having a composition (at N.T.P.).

$$4,750 \text{ m.}^3/\text{h. SO}_2$$
$$860 \text{ m.}^3/\text{h. SO}_3$$
$$2,850 \text{ m.}^3/\text{h. O}_2$$
$$35,400 \text{ m.}^3/\text{h. N}_2$$

is fed to the catalytic furnace.

As regards the conversion by the catalyst, as in Example 1, here also the increase in conversion in the first stage is lowered by the presence of SO₃, so that the reaction temperature decreases from about 615° C. to 590° C. Hence an SO₂ conversion of 66% is produced. The total conversion in a five-stage catalyst system with an intermediate absorption before the penultimate stage amounts to 99.8% of SO₂.

It will be appreciated that the instant specification and examples are set forth by way of illustration and not limitation and that various modifications and changes may be made without departing from the spirit and scope of the present invention.

What is claimed is:

1. In the process for producing SO₃ comprising the steps of catalytically oxidizing SO₂ with air to SO₃ in a plurality of contact stages and subjecting the product gases to absorption to remove some of the SO₃ at some stage prior to the last and after an SO₂ conversion of about 80 to 95%, the improvement which comprises continually incorporating in the SO₂-containing gas prior to its introduction into the first catalyst stage an air stream which has been passed through oleum and thereby picked up SO₃, the proportions being such that the resultant gas fed to the first catalyst stage contains about 2 to 10% by volume of SO₃.

2. Process according to claim 1, wherein the SO₂-containing gas mixed with the SO₃-containing air initially has an SO₂ content of about 12 to 21% by volume and, after mixing, has an SO₂ content of about 10 to 14% by volume.

3. Process according to claim 2, wherein the initial SO₂-containing gas is produced by burning of sulfur.

4. Process according to claim 1, wherein the SO₂-containing gas mixed with the SO₃-containing air initially has an SO₂ content of about 12 to 30% by volume and, after mixing, has an SO₂ content of about 10 to 20% by volume.

5. Process according to claim 4, wherein the initial SO₂-containing gas is produced by roasting or cleavage of sulfur-containing minerals or fluids.

6. Process according to claim 1, wherein the liquid which is used to absorb some of the SO₃ in the product gases prior to the last stage is taken from a common supply with the oleum through which the air stream is passed to pick up SO₃.

References Cited

UNITED STATES PATENTS

| | | | |
|---|---|---|---|
| 1,477,107 | 12/1923 | Carey | 23—176 |
| 2,879,135 | 3/1959 | Haltmeier | 23—168 |
| 3,142,536 | 7/1964 | Guth et al. | 23—175 |
| 3,443,896 | 5/1969 | Furkert et al. | 23—168 |
| 2,136,298 | 11/1938 | Harrison et al. | 23—175 |

OTHER REFERENCES

Duecker, W. W. et al.: The Manufacture of Sulfuric Acid, Reinhold Pub., New York, 1959, pp. 149–53.

GEORGE O. PETERS, Primary Examiner